US012596320B2

(12) United States Patent
Suzuki

(10) Patent No.: US 12,596,320 B2
(45) Date of Patent: Apr. 7, 2026

(54) CORRECTING DENSITY UNEVENNESS IN IMAGE FORMING APPARATUS

(71) Applicant: CANON KABUSHIKI KAISHA, Tokyo (JP)

(72) Inventor: Teruhiko Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/904,202

(22) Filed: Oct. 2, 2024

(65) Prior Publication Data

US 2025/0116958 A1 Apr. 10, 2025

(30) Foreign Application Priority Data

Oct. 5, 2023 (JP) ................................ 2023-173859

(51) Int. Cl.

*G03G 15/00* (2006.01)
*G03G 15/02* (2006.01)
*G03G 15/043* (2006.01)
*G03G 15/06* (2006.01)

(52) U.S. Cl.

CPC ..... *G03G 15/5058* (2013.01); *G03G 15/0266* (2013.01); *G03G 15/043* (2013.01); *G03G 15/065* (2013.01); *G03G 15/505* (2013.01); *G03G 2215/00059* (2013.01)

(58) Field of Classification Search

CPC ............. G03G 15/505; G03G 15/5054; G03G 15/5058; G03G 15/5062; G03G 2215/00059

See application file for complete search history.

(56) References Cited

U.S. PATENT DOCUMENTS

| | | | | |
|---|---|---|---|---|
| 5,107,302 | A * | 4/1992 | Bisaiji | G03G 15/0855 399/49 |
| 2008/0038004 | A1* | 2/2008 | Inoue | G03G 15/6564 399/394 |
| 2017/0038719 | A1* | 2/2017 | Takemura | G03G 15/5062 |
| 2017/0285552 | A1* | 10/2017 | Nakade | G03G 15/1605 |
| 2023/0384725 | A1* | 11/2023 | Sone | G03G 15/065 |

FOREIGN PATENT DOCUMENTS

JP 2014139604 A 7/2014

* cited by examiner

*Primary Examiner* — Carla J Therrien
(74) *Attorney, Agent, or Firm* — ROSSI, KIMMS & McDOWELL LLP

(57) ABSTRACT

A test image is formed by an image forming unit. A sensor receives light reflected from a test image on an intermediate transfer member passing through a detection position and outputs an output signal based on a reception result of the reflected light. A controller reduces density unevenness of images to be formed in a rotation direction of a photosensitive member based on a correction data, determines a reference output signal used to generate the correction data among output signals output from the sensor in time series based on a timing at which the test image reaches the detection position.

15 Claims, 12 Drawing Sheets

CORRECTING DENSITY UNEVENNESS IN IMAGE FORMING APPARATUS

BACKGROUND OF THE INVENTION

Field of the Invention

The present invention relates to a method for correcting density unevenness in an image forming apparatus.

Description of the Related Art

In an image forming apparatus in which an image is transferred to a sheet using a rotating member, density unevenness in accordance with a rotation period of the rotating member may occur in the image. According to Japanese Patent Laid-Open No. 2014-139604, there has been proposed a technique of detecting periodic density unevenness from toner images formed on an intermediate transfer belt, and correcting a control parameter so that the density unevenness is reduced.

According to Japanese Patent Laid-Open No. 2014-139604, an output signal of an optical sensor head is acquired in synchronization with an output signal of a home position sensor that detects a home position of a photosensitive drum. That is, sampling of the output signal of the optical sensor head is started after a predetermined time from the output signal of the home position sensor. This is because it is assumed that the toner image always arrives at the optical sensor head at a constant conveyance time. However, when a slip occurs between the photosensitive drum and the intermediate transfer belt, an arrival time of the toner image deviates from an ideal time. Consequently, a relationship between a measurement phase of the density unevenness and a rotational phase of the photosensitive drum is shifted, and a measurement accuracy of the density unevenness is lowered. If correction data of an exposure amount is generated from the data of the density unevenness, the exposure amount will be corrected by the correction data generated from a density unevenness of a rotational phase different from a correct rotational phase. As a result, the density unevenness will not be accurately corrected.

SUMMARY OF THE INVENTION

The present disclosure provides an image forming apparatus that forms an image on a sheet, the apparatus comprising: an image forming unit configured to form an image on a photosensitive member that rotates; an intermediate transfer member to which the image is transferred from the photosensitive member; a sensor configured to receive reflected light from a test image on the intermediate transfer member passing through a detection position and output an output signal based on a reception result of the reflected light, the test image being formed by the image forming unit; and a controller configured to: reduce density unevenness of images to be formed in a rotation direction of the photosensitive member based on correction data; and determine a reference output signal used to generate the correction data among output signals output from the sensor in time series based on a timing at which the test image reaches the detection position.

Further features of the present invention will become apparent from the following description of exemplary embodiments (with reference to the attached drawings).

BRIEF DESCRIPTION OF THE DRAWINGS

FIG. 2 is a diagram for explaining controllers including a CPU and the like.

DESCRIPTION OF THE EMBODIMENTS

Figure 1:
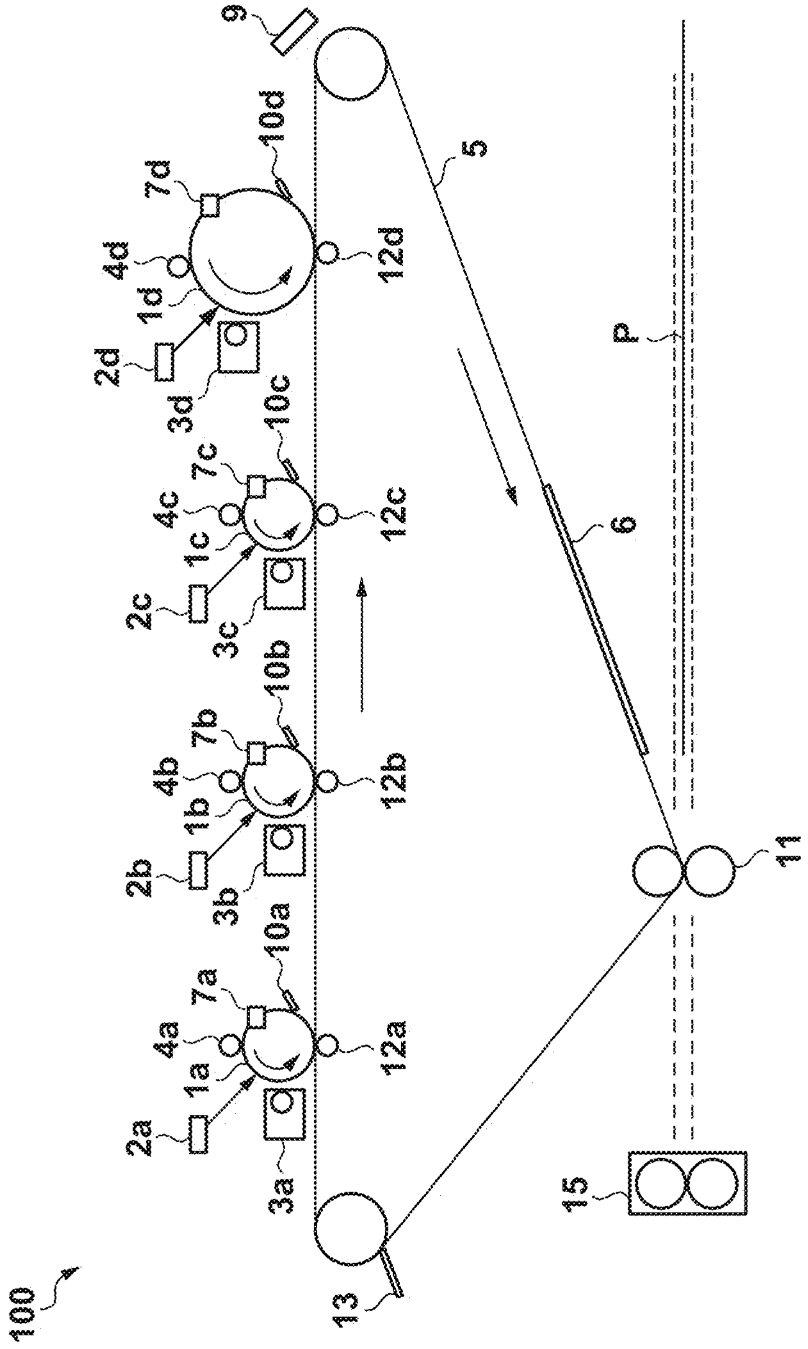
FIG. 1 is a diagram for explaining an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(1) Mechanical Structure

FIG. 1 shows a mechanical structure of an image forming unit in an electrophotographic image forming apparatus 100. In FIG. 1, "a", "b", "c", and "d" assigned to an end of reference numerals correspond to toner colors, yellow "Y", cyan "C", magenta "M", and black "K". Therefore, in describing matters that are common to four colors, "a", "b", "c", and "d" characters may be omitted from the reference numerals.

A photosensitive drum 1 is an image carrier that carries an electrostatic latent image or a toner image and, rotates in a predetermined direction. A diameter of the photosensitive drum 1*d* for black images is larger than a diameter of the photosensitive drums 1*a*, 1*b*, 1*c* for other colors. Generally, a black image is formed frequently. Therefore, by increasing the diameter of the photosensitive drum 1*d* for black images, a lifetime of the photosensitive drum 1*d* for black images is prolonged.

A charging roller 4 works as a charging member that uniformly charges a front face of the photosensitive drum 1. An exposure device 2 includes a light source configured to irradiate the front face of the photosensitive drum 1 with a laser beam corresponding to an image signal to form an electrostatic latent image. A developing device 3 includes a developing sleeve that develops the electrostatic latent image using toner to form a toner image. A primary transfer roller 12 transfers the toner image from the photosensitive drum 1 to an intermediate transfer belt 5. A drum cleaner 10 is a cleaning member that cleans toner remaining in the photosensitive drum 1. A full-color image is formed by superimposing a yellow toner image, a magenta toner image, a cyan toner image, and a black toner image.

When the intermediate transfer belt 5 rotates, the toner images 6 are conveyed to a secondary transfer unit. The secondary transfer unit is a nip portion formed by abutting a secondary transfer roller 11 and the intermediate transfer belt 5. The secondary transfer roller 11 transfers the toner images 6 to a sheet P. A fixing device 15 heats and pressurizes the toner image and the sheet P to fix the toner image on the sheet P. The fixing device 15 includes a heater for heating and two opposing rotating members (e.g., roller and cylindrical film) for pressurization. Toner remaining on the intermediate transfer belt 5 is cleaned by a belt cleaner 13.

As described above, density unevenness may occur in the toner image 6 in accordance with a period of the rotating member. In the following, the photosensitive drum 1 is employed as an example of a rotating member. The image forming apparatus 100 forms a toner image (test image) for detecting density unevenness on the intermediate transfer belt 5. A density sensor 9 detects a density of the test image to obtain data (profile data) of the density unevenness for one cycle of the photosensitive drum 1. Based on the profile data, the image forming apparatus 100 corrects a control parameter that affects the density of the toner image so that the density unevenness is reduced. Examples of the control parameter include an exposure amount, a charging voltage, and a developing voltage. In the present embodiment, the exposure amount is corrected as an example.

A HP sensor 7 is a phase sensor or a phase detector for detecting a rotational phase of the photosensitive drum 1. The term "HP" is an abbreviation for "home position". The home position corresponds to a reference phase in the rotational phase.

A mark indicating the home position is formed at a position on the front face of the photosensitive drum 1. The mark may be an optical mark or a magnetic mark. The image forming apparatus 100 creates profile data by associating the rotational phase of the photosensitive drum 1 acquired by the HP sensor 7 with the density unevenness acquired by the density sensor 9.

When the image forming apparatus 100 forms an image (user image) arbitrarily prepared by a user, the image forming apparatus 100 determines a correction value of the exposure amount corresponding to the rotational phase of the photosensitive drum 1 acquired by the HP sensor 7 based on the profile data, and corrects the exposure amount based on the correction value. Alternatively, the correction value corresponding to the rotational phase may be read out from the correction data which is a set of correction values created in advance from the profile data.

(2) Electrical Configuration

Figure 2:
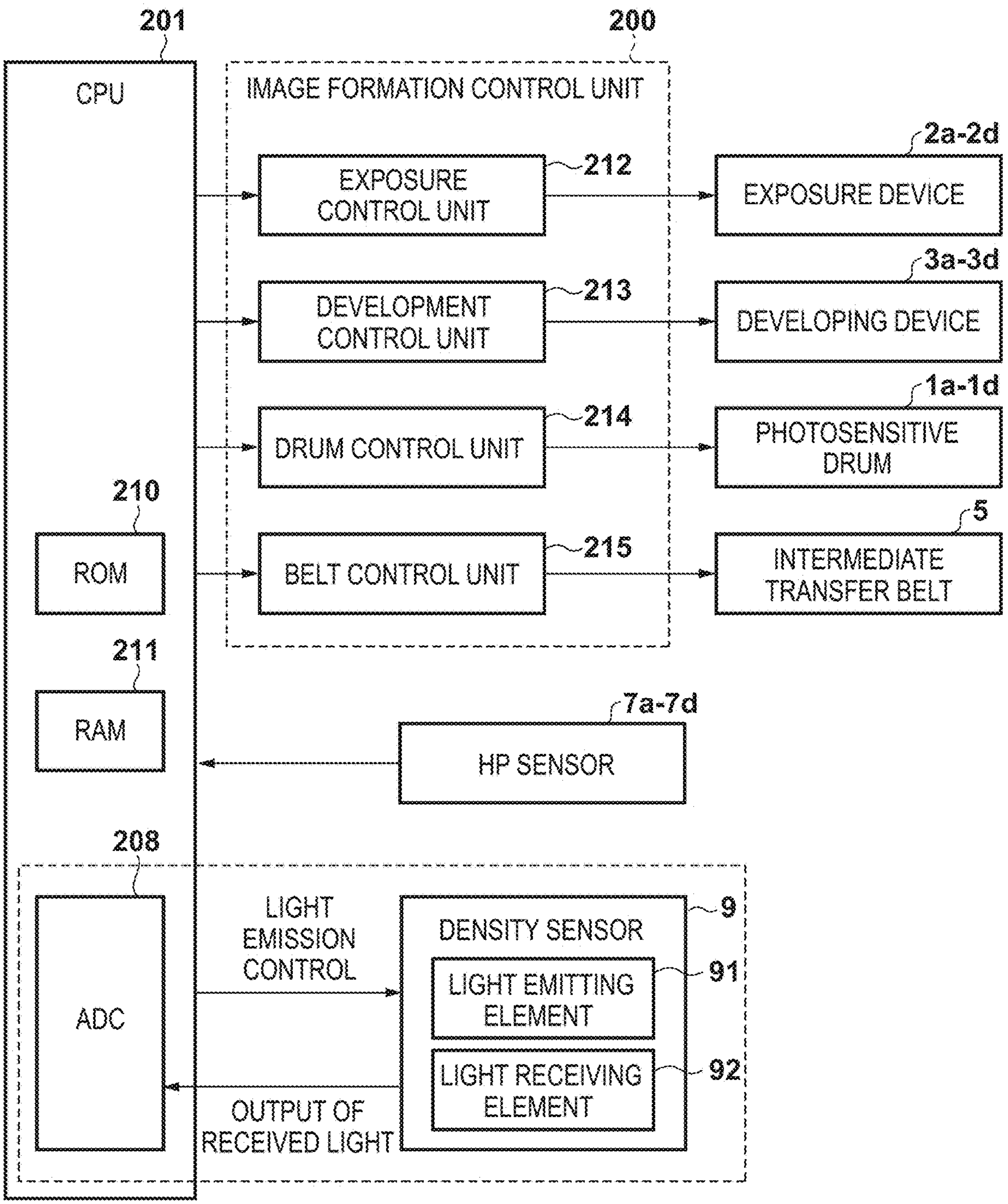

FIG. 2 shows an electric configuration of the image forming apparatus 100. A CPU 201 detects the home position (reference phase) of the photosensitive drums 1*a* to 1*d* by detecting the output signal of the HP sensors 7*a* to 7*d*. Accordingly, the CPU 201 can specify which position on the photosensitive drum 1 is being exposed. The term "CPU" is an abbreviation for "central processing unit". The CPU 201 may be referred to as a controller or a control board. The CPU 201 may be implemented by a hardware circuit such as an application-specific integrated circuit (ASIC) or a field-programmable gate array (FPGA).

The density sensor 9 includes a light emitting element 91 that emits light toward the test image, and a light receiving element 92 that receives light reflected from the surface (base) of the test image or the intermediate transfer belt 5. The position on the intermediate transfer belt 5 irradiated with the light from the light emitting element 91 is a detection position. The light receiving element 92 work as an output unit (sensor) that receives (senses) the reflected light from the test image passing through the detection position, and outputs an output value (output signal) based on a light reception result (detection result) of the reflected light from the test image. The CPU 201 controls turning on and off of the light emitting elements 91. CPU 201 may include an analog-to-digital converter (ADC) 208. The ADC 208 is a converter that converts a current value (analog signal) outputted from the light receiving element 92 into a voltage value (digital signal). The ADC 208 may convert the analog current value to the digital current value. The light receiving element 92 is not limited to an element that outputs a current value, but may be an element that outputs a voltage value. In this case, the ADC 208 may then convert the analog voltage value to the digital voltage value.

The image formation control unit 209 includes an exposure control unit 212, a development control unit 213, a drum control unit 214, and a belt control unit 215. The exposure control unit 212 controls turning on, turning off, and an exposure amount of the exposure device 2*a*-2*d* in accordance with a command outputted from the CPU 201. The exposure amount is a control parameter that affects the density of the toner image. Usually, the exposure amount is an exposure amount capable of achieving the maximum density in the toner image. By modulating laser light of the exposure amount in accordance with the user image, toner images of various gradations are formed. The development control unit 213 controls the developing voltage of the developing device 3*a*-3*d* in accordance with a command outputted from the CPU 201. The developing voltage is a control parameter for controlling easiness of adhesion of toner to an electrostatic latent image. The drum control unit 214 controls a motor that rotationally drives the photosensitive drums 1*a*-1*d*, and controls the charging voltage of the charging roller 4*a*-4*d*. The belt control unit 215 controls a motor that drives the intermediate transfer belt 5 and controls a primary transfer voltage of the primary transfer roller 12*a* to 12*d*.

The CPU 201 controls the image forming apparatus 100 by executing a control program stored in a ROM 210. The term "ROM" is an abbreviation for "read-only memory", and is an example of a non-volatile memory. A RAM 211 is configured to store temporary data during the control program being executed. The term "RAM" is an abbreviation of "random access memory", and is an example of a volatile memory.

The ROM 210 may store image data of the test image used to detect density unevenness. The CPU 201 reads the image data from the ROM 210, generates an image signal, and outputs the image signal to the exposure control unit 212. The exposure control unit 212 controls the exposure device 2 to modulate the laser beam according to the image signal and scan the laser beam on the photosensitive drum 1. As a result, an electrostatic latent image of the test image is formed. The electrostatic latent image is then developed to form a toner image of the test image. The test image is transferred to the intermediate transfer belt 5 and detected by the density sensor 9. The test image may be a halftone image of a predetermined gradation (e.g., intermediate gradation).

The ADC 208 converts an analog signal outputted from the light receiving element 92 of the density sensor 9 into a digital signal (digital value). The CPU 201 associates this digital value with the rotational phase of the photosensitive drum 1 to create and store the profile data in the RAM 211. The CPU 201 calculates a difference between the profile data and a target image density characteristic (gradation characteristic), and corrects a control parameter that affects the image density based on the calculation result. Here, a correction value for each rotational phase of the photosensitive drums 1*a*-1*d* may be obtained, and correction data, which is a set of correction values for the entire circumference of the photosensitive drums 1*a*-1*d*, may be created in advance. Alternatively, the correction value may be determined in real time based on the profile data.

Note that the profile data is created for the photosensitive drums 1*a*-1*d* individually. This is because the characteristics of the density unevenness may differ for each of the photosensitive drums 1*a*-1*d*.

(3) Phase Shift Problem in Correction of Density Unevenness

Figure 3A:
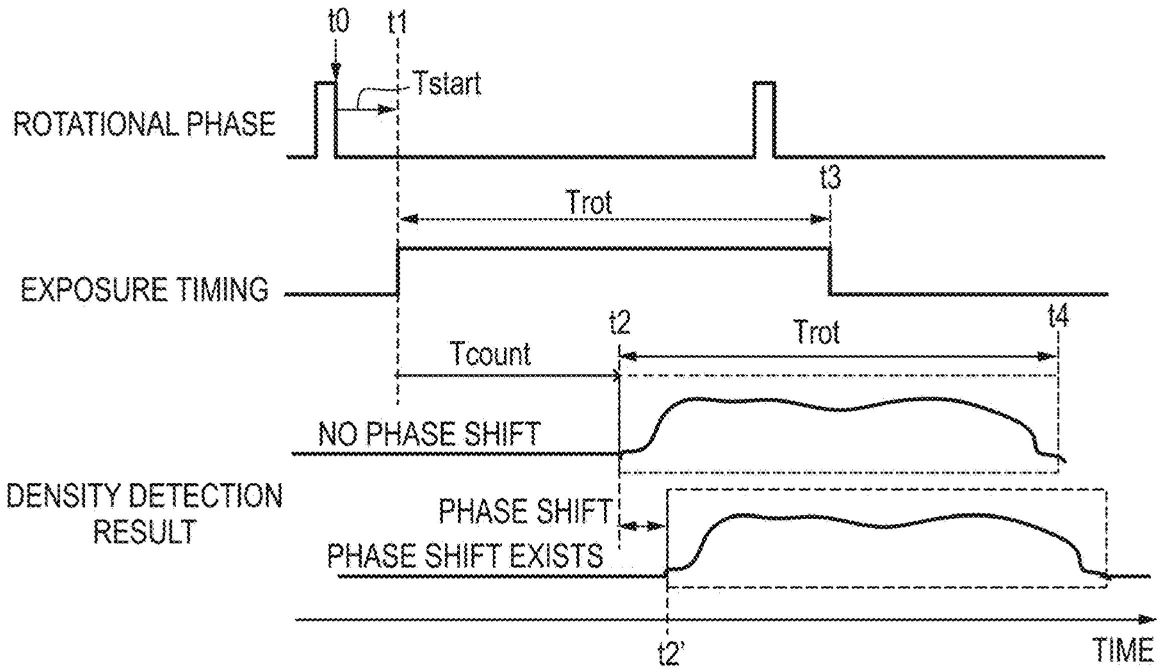
FIG. 3A is a view for explaining a phase shift of density unevenness.

FIG. 3A is a timing chart illustrating signals of generating profile data. Here, the output signal of the HP sensor 7, the exposure/non-exposure of the exposure device 2, and the density detection result (analog signal) of the density sensor 9 are shown. The time to is a falling timing of output signals of the HP sensor 7. The time to corresponds to the reference phase. Note that the CPU 201 may determine the rotational phase of the photosensitive drum 1 by using a counter that is reset each time the output signal of the HP sensor 7 falls. In other words, a count value of the counter indicates the rotational phase of the photosensitive drum 1. Note that the HP sensor 7 may be an encoder attached to a rotating shaft of the photosensitive drum 1.

The time t1 is a timing at which a predetermined time Tstart has elapsed from the time t0. The CPU 201 causes the exposure device 2 to begin exposure at the time t1.

Here, the exposure amount is controlled to be constant so that the test image is a halftone image of a predetermined gray level. The CPU 201 continues the exposure from the time t1 to the time t3. Here, the time Trot from the time t1 to the time t3 corresponds to the time (one cycle) required for the photosensitive drum 1 to rotate one time (round). As a result, the test image (electrostatic latent image) having a length corresponding to at least one circumference length of the photosensitive drum 1 are formed on the photosensitive drum 1. The halftone image is adopted as the test image because the density of the halftone image tends to vary more easily.

The time t2 is a timing at which the time Tcount has elapsed from the time t1.

At the time t2, the front end of the test image arrives at the detection position of the density sensor 9. The CPU 201 starts sense of the test image by the density sensor 9 at the time t2. Tcount is a time obtained by dividing the sum of the distance on the peripheral surface from the exposure position on photosensitive drum 1 to a primary transfer position and the distance on the peripheral surface of the intermediate transfer belt 5 from the primary transfer position to the detection position by the process speed. The process speed is the same as the peripheral speed of the photosensitive drum 1 or the peripheral speed of the intermediate transfer belt 5. The primary transfer position is a contact position between the photosensitive drum 1 and the intermediate transfer belt 5. The CPU 201 samples the detection result of the density sensor 9 from the time t2 to the time t4 to create the profile data for the entire circumference of the photosensitive drum 1. The density detected at the time t2 is the density of the rotational phase corresponding to the time t1 among the rotational phases of the photosensitive drum 1.

In forming the user image, the CPU 201 reads the profile data associated with the rotational phase corresponding to the exposure starting timing (time t1) from the RAM 211, and corrects the exposure amount according to the profile data. Thereafter, the CPU 201 reads the profile data from the RAM 211 every time the rotational phase advances, and corrects the exposure amount according to the profile data. Thus, the density unevenness is corrected in accordance with the rotational phase of the photosensitive drum 1. As the control parameter for correcting the density unevenness, the developing voltage or the charging voltage may be adopted instead of the exposure amount. If the control parameter is the developing voltage, the correction value of the developing voltage over the entire circumference of the photosensitive drums 1*a*-1*d* corresponds to the correction data. If the control parameter is a charging voltage, the correction value of the charging voltage over the entire circumference of the photosensitive drums 1*a*-1*d* corresponds to the correction data.

Figure 3B:
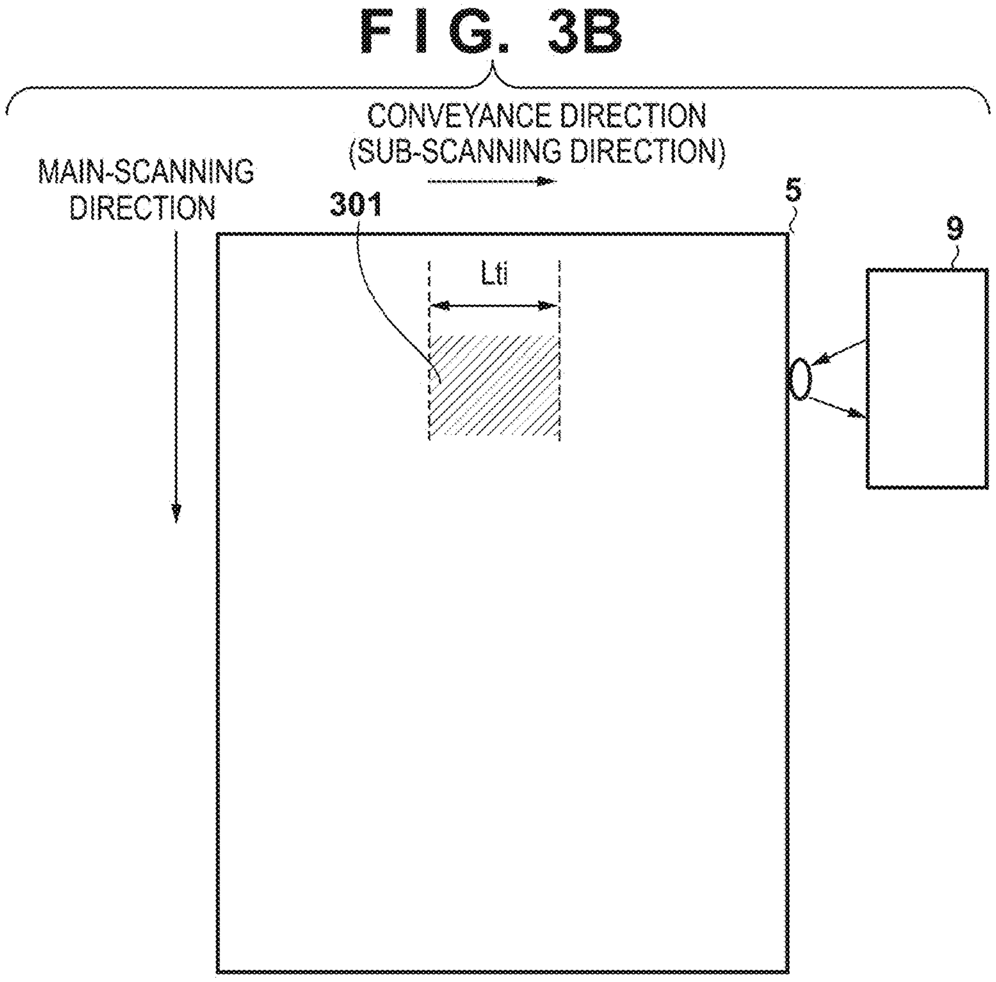
FIG. 3B is a view for explaining a test image.

FIG. 3B shows a positional relations between the test image 301, the intermediate transfer belt 5, and the density sensor 9. The test image 301 is formed at a position readable by the density sensor 9 on the surface of the intermediate transfer belt 5. Here, the direction in which photosensitive drum 1 rotates (rotation direction) is referred to as a sub-scanning direction. Note that a traveling direction (rotation direction) of the intermediate transfer belt 5 is also a direction parallel to the sub-scanning direction, and the traveling direction (rotation direction) of the intermediate transfer belt 5 can also be referred to as a sub-scanning direction. A direction orthogonal to the sub-scanning direction is referred to as a main scanning direction. A length of the test image 301 in the main scanning direction is larger than a diameter of the detection spot of the density sensor 9. The length Lti of the test image 301 in the sub-scanning direction is at least equal to or greater than the circumferential length of the photosensitive drum 1.

When the exposure amount is corrected based on the profile data acquired before the user image is formed, the following problem exists. In order to compensate for the density unevenness over the entire circumference of the photosensitive drum 1, the phase of the profile data must coincide with the rotational phase of the photosensitive drum 1. The manner in which the phase of the profile data and the rotational phase of the photosensitive drum 1 are matched is as described in connection with FIG. 3A.

However, when the distance between the detection position of the density sensor 9 and the exposure position on the front face of the photosensitive drum 1 is increased, a phase shift as shown in FIG. 3A is likely to occur. The phase shift is a phenomenon in which a phase difference between the exposure start phase and the detection start phase of the density deviates from the ideal phase difference. As illustrated in FIG. 3A, the exposure starting phase is a phase corresponding to the time t1. The ideal detection starting phase is a phase corresponding to the time t2. When a phase shift occurs, a leading edge of the toner image arrives at the detection position at a time t2' that differs from the time t2. When the profile data is acquired from the time t2 in spite of the occurrence of the phase shift, the relationship between the rotational phase and the density unevenness is shifted in the profile data. When such profile data is used, the correction accuracy of the density unevenness may decrease.

Factors of the phase shift include a tolerance of the detection position of the density sensor 9 with respect to the intermediate transfer belt 5 and a tolerance of the position of the contact portion between photosensitive drum 1 and the intermediate transfer belt 5. These tolerances may be referred to as relative position tolerances. Further, when the intermediate transfer belt 5 slips with respect to the photosensitive drum 1, the transfer position of the toner images is displaced, which causes a phase shift.

The relative positional tolerance depends on the number of parts involved in the conveyance of the toner image. The rotation shaft of the photosensitive drum 1, the rotation shaft of the rotation roller of the intermediate transfer belt 5, and the density sensor 9 are supported by the body frame of the image forming apparatus 100. As the number of support parts supporting them is reduced, the relative positional tolerances are also reduced. As a consequence, the phase shift converted into the length is about 0.2 mm. Further, when the slip occurs, the phase shift converted into the length may be equal to or larger than 1 mm. The drum unit including the photosensitive drum 1 and components supporting the intermediate transfer belt 5 is replaced at its end of life. As a result, the relative position tolerance also changes. Therefore, the profile data obtained when the image forming apparatus 100 is shipped from the factory may not be able to correct the density unevenness correctly.

(4) First Embodiment

Therefore, in the present embodiment, the profile data is created with higher accuracy than in the related art. As a result, the density unevenness is corrected with higher accuracy than in the related art. For example, in order to match the phase in the profile data with the rotational phase in photosensitive drum 1, the CPU 201 specifies the rotational phase in which the exposure is started in the analog signal outputted from the density sensor 9.

Figure 4:
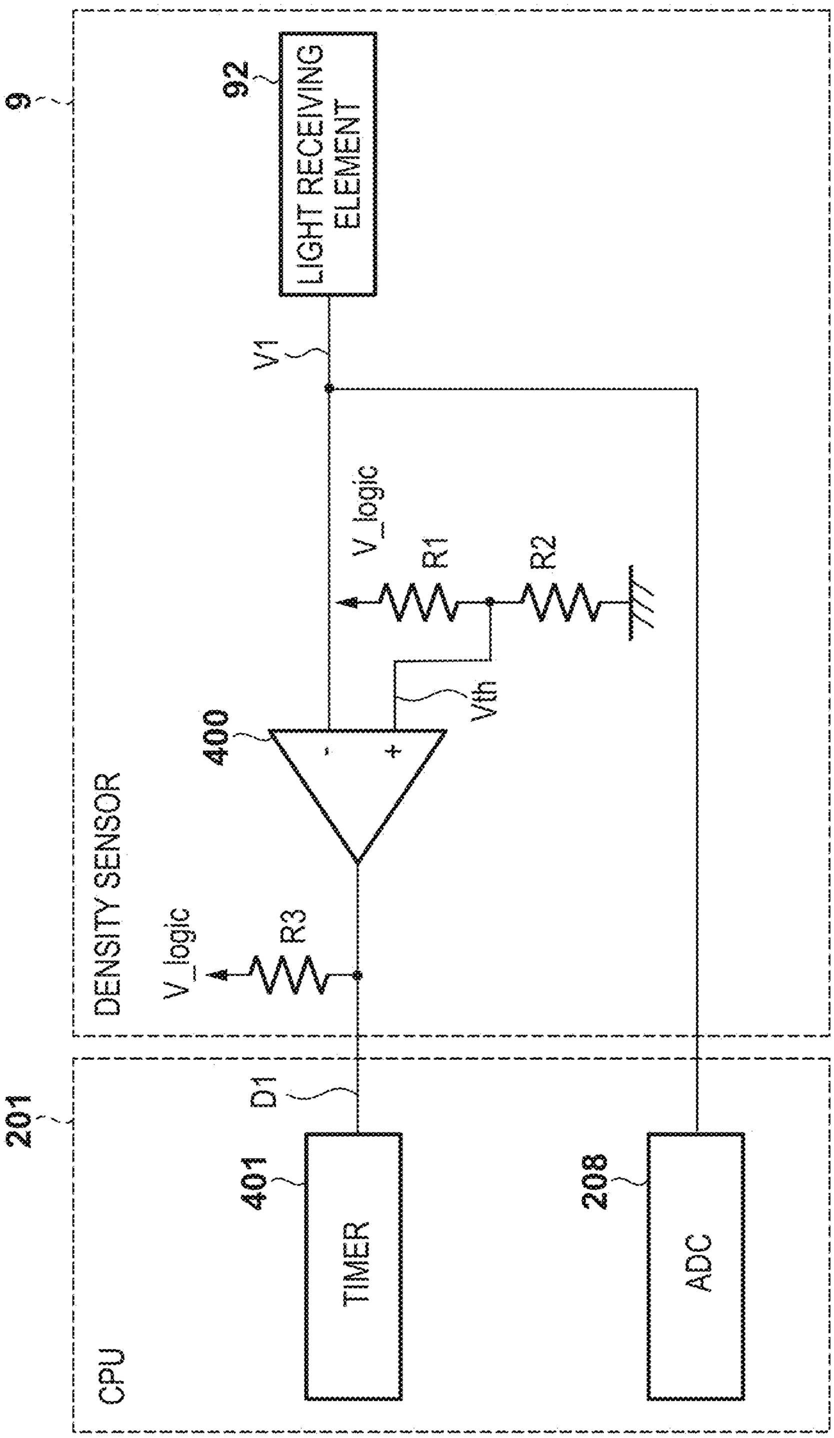
FIG. 4 is a diagram for illustrating a density sensor and a CPU.

FIG. 4 shows an excerpt of the CPU 201 and the density sensor 9 which are involved in acquiring the profile data. An output terminal of the light receiving element 92 is connected to an input terminal of the ADC 208 and a negative terminal of the comparator 400. The light receiving element 92 converts a detection current corresponding to the received light amount (received light intensity) into a detection voltage V1 and outputs the detection voltage V1.

A positive terminal of the comparator 400 is supplied with a threshold voltage Vth. The threshold voltage Vth is generated by dividing the power supply voltage V_logic by the voltage dividing resistors R1, R2.

$$Vth = \text{V\_logic} \times R2/(R1 + R2) \qquad \text{Eq. 1}$$

Note that one end of the voltage dividing resistor R1 is connected to the power supply voltage V_logic. The other end of the voltage dividing resistor R1 is connected to the positive terminal of the comparator 400 and one end of the voltage dividing resistor R2. The other end of the voltage dividing resistor R2 is connected to a frame ground (GND). Thus, the comparator 400 compares the analog signal (output signal) output in time series from the light receiving elements 92 of the density sensor 9 with the threshold voltage Vth (threshold value). An output terminal of the comparator 400 has an open collector or a similar output circuit. The output terminal of the comparator 400 is connected to the power supply voltage V_logic via a pull-up resistor R3. Further, the output terminal the comparator 400 is connected to the timer 401 of the CPU 201. The output terminal of the comparator 400 outputs a binarized signal (digital signal D1) obtained by binarizing the detection voltage V1, which is an analog signal, with the threshold voltage Vth.

When the detection voltage V1 is below the threshold voltage Vth, the output terminal of the comparator 400 does not draw current. Therefore, the digital signal D1 is at a high level (High). On the other hand, when the detection voltage V1 exceeds the threshold voltage Vth, the output terminal of the comparator 400 draws a current. Therefore, the digital signal D1 is at a low level (Low).

The CPU 201 identifies or determines the timing at which the level of the digital signal D1 changes from the high level to the low level as the exposure starting timing of the test image 301. Here, the timing at which the level of the digital signal D1 changes from the high level to the low level is the timing at which the test image 301 on the intermediate transfer belt 5 reaches the detection position of the density sensor 9. Note that the comparator 400 corresponds to a detection unit that detects a timing at which the test image 301 on the intermediate transfer belt 5 reaches the detection position of the density sensor 9. The CPU 201 starts sampling the analog signal V1 by operating the ADC 208 from the exposure start timing. When the timer 401 counts a predetermined time Trot from the exposure starting timing, the CPU 201 stops the ADC 208.

Figure 5:
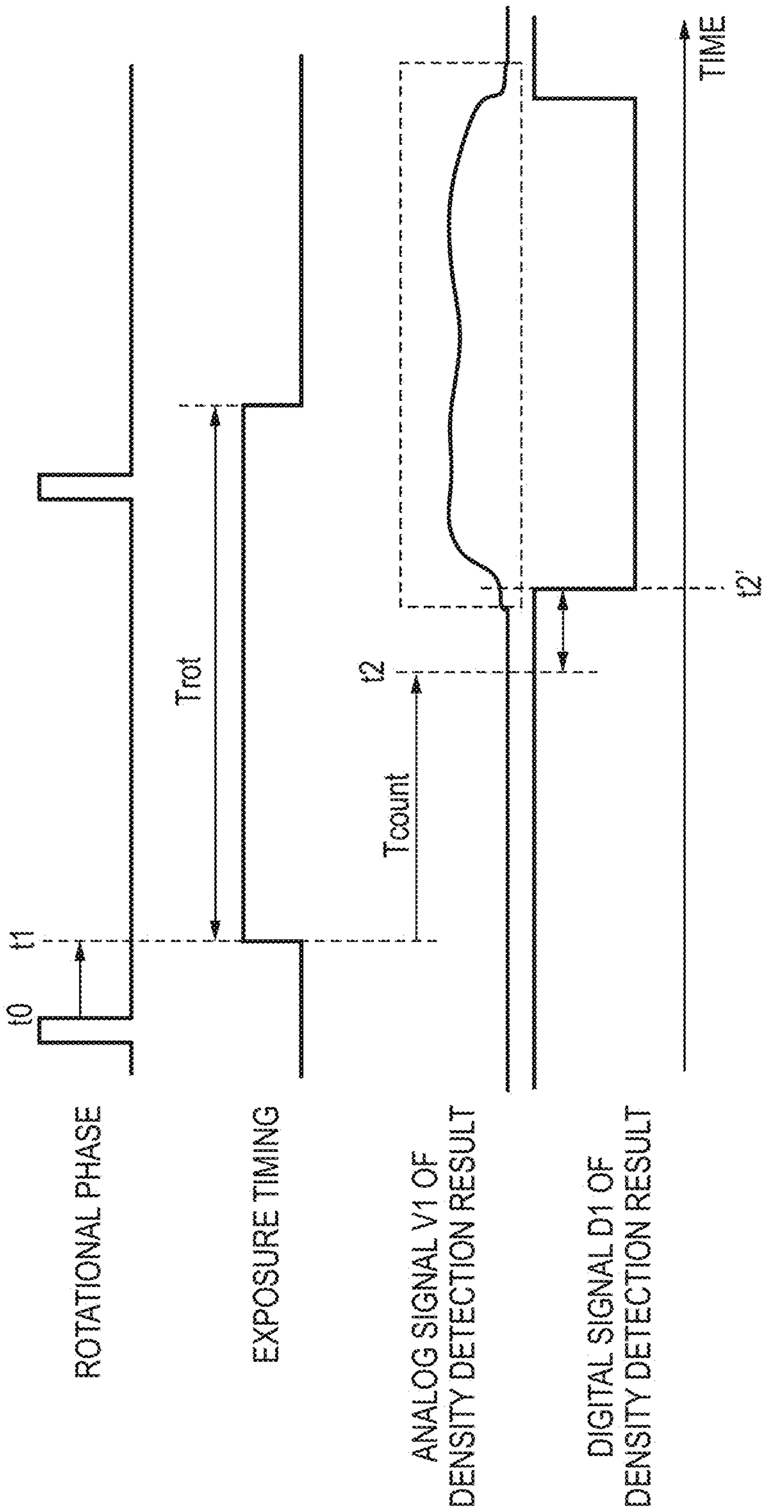
FIG. 5 is a timing chart showing how to obtain profile data.

FIG. 5 shows a timing chart for explaining the start of acquisition of the profile data. Here, the rotational phase of the photosensitive drum 1, the exposure timing, the analog signal V1 of the density detection result, and the digital signal D1 of the density detection result are shown.

At the time to, a signal outputted from the HP sensor 7 falls. At a timing (time t1) at which the predetermined time Tstart has elapsed from the time to, the exposure device 2 starts outputting the laser beam so as to have a constant exposure amount. The outputting of the laser beam is performed over a time period equal to or longer than a time Trot corresponding to the entire circumference of the photosensitive drum 1. As a result, the test image 301 is formed. Thereafter, the test image 301 is conveyed to the detection position of the density sensor 9, and is detected by the density sensor 9.

The timing at which the ADC 208 starts acquiring the density of the test image 301 (time t2') is a time at which the analog signal V1 exceeds the threshold voltage Vth. That is, the time t2' is a timing at which the digital signal D1 changes from high to low. As described above, the CPU 201 uses the timing at which the level of the digital signal D1 changes as the timing at which the density is started to be acquired. The CPU 201 determines an analog signal (reference output signal) that is used to generate the correction data among the analog signals (output signals) that are output in time series from the light receiving elements 92 based on the timing at which the test image 301 on the intermediate transfer belt 5 reaches the detection position of the density sensor 9. As a result, the influence of the phase shift is reduced, and the profile data is created with higher accuracy than in the related art.

The CPU 201 samples the analog signal V1 at a predetermined sampling period Tdistance using the timer 401, and acquires the profile data indicating the density unevenness for each rotational phase of the photosensitive drum 1.

In FIG. 5, the length of the test image 301 in the sub-scanning direction is equal to the circumferential length of the photosensitive drum 1. However, in view of influence of an optical spot diameter of the density sensor 9, the length of the test image 301 in the sub-scanning direction may be a length that exceeds the circumferential length of the photosensitive drum 1. After the digital signal D1 changes, and at a timing (stable timing) at which the analog signal V1 is less susceptible to the spot diameter of the density sensor 9, the CPU 201 may begin acquiring the profile data. When one cycle of the photosensitive member drum 1 has elapsed from the stable timing, the CPU 201 terminates acquiring the profile data. When the time difference between the timing at which the digital signal D1 changes and the stable timing is a negligible time difference, the density unevenness acquired at the stable timing may be treated as the density unevenness acquired at the exposure starting timing. If the time difference is not negligible, the CPU 201 obtains the profile data by shifting a rotational phase corresponding to the time t2' by the time difference and associating the shifted rotational phase with the stable timing.

Figure 6:
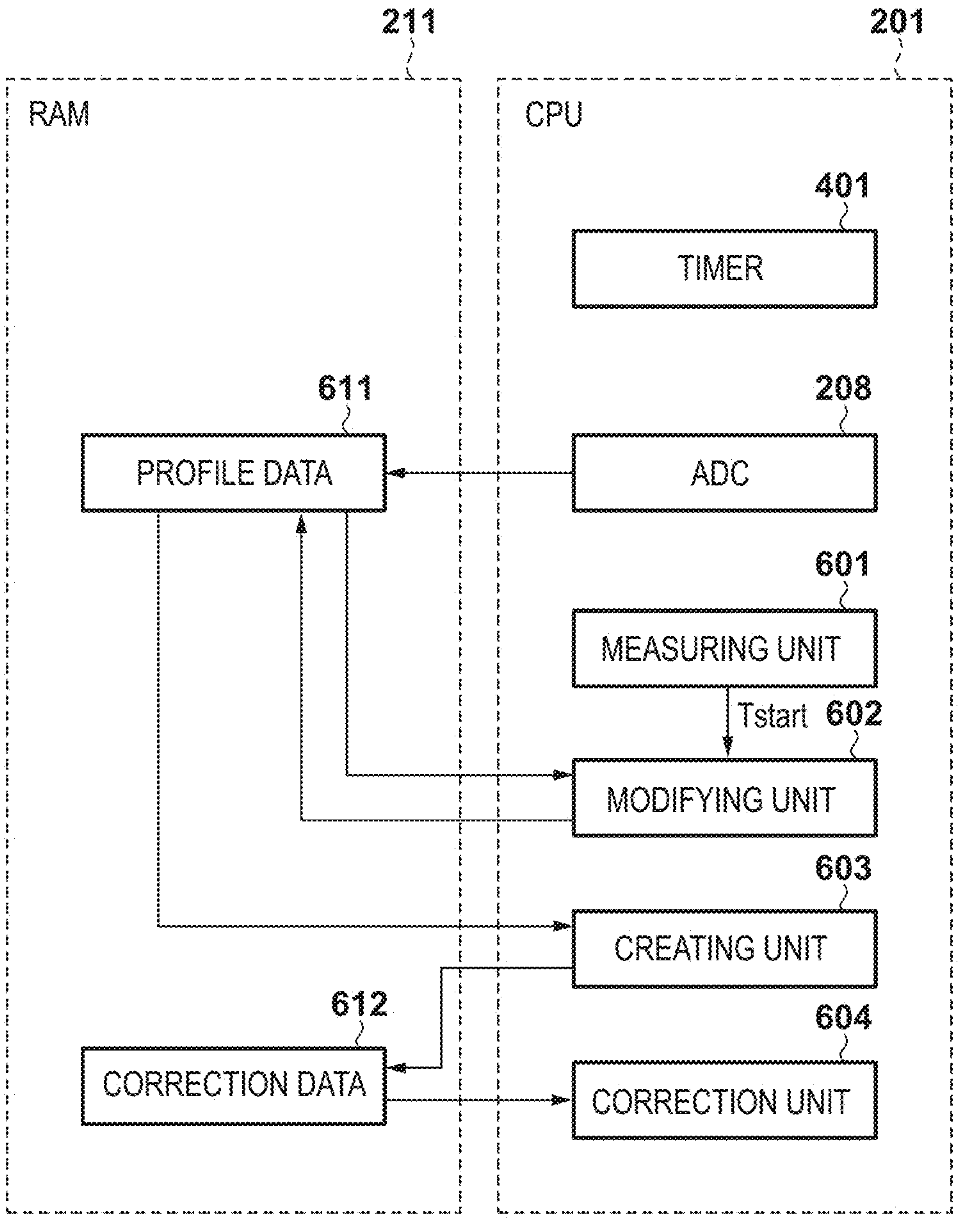
FIG. 6 is a diagram showing functions realized by the CPU.

FIG. 6 shows functions realized by the CPU 201 executing a control program. When the level of the digital signal D1 changes from High to Low, the ADC 208 starts acquiring the profile data 611 and stores the profile data 611 in the RAM 211. The measuring unit 601 measures a Tstart which is a time difference from the time to at which the HP is detected to the time t1 at which the exposure is started. The modifying unit 602 reads the profile data 611 from the RAM 211, modifies the phase of the profile data 611, and writes the profile data 611 back to the RAM 211. For example, the modifying unit 602 shifts the phase of the profile data 611 by a phase difference corresponding to Tstart. Thus, the profile data 611 is corrected to the profile data starting from the reference phase (home position) as a starting point. The creating unit 603 reads the profile data 611 from the RAM 211, creates the correction data 612 of the exposure amount based on the profile data 611, and stores the correction data 612 in the RAM 211. The correction unit 604 corrects the exposure amount for forming the user image based on the correction data 612. As a result, the density unevenness is reduced with high accuracy. Note that a correction target may be the charging voltage or the developing voltage.

Figure 7B:
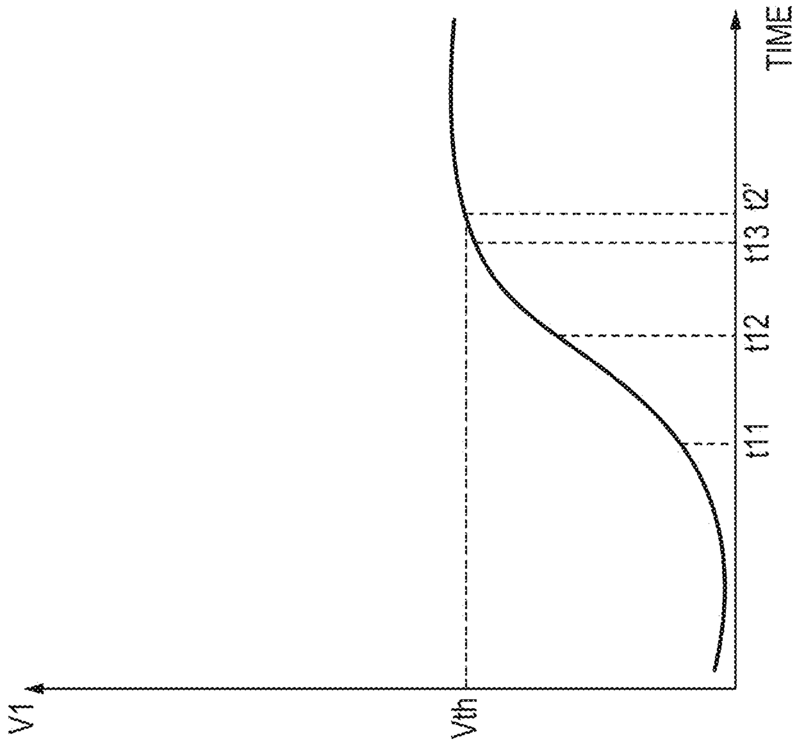
FIGS. 7A and 7B are diagrams for explaining a detection area (detection spot) of a density sensor.
Figure 7A:
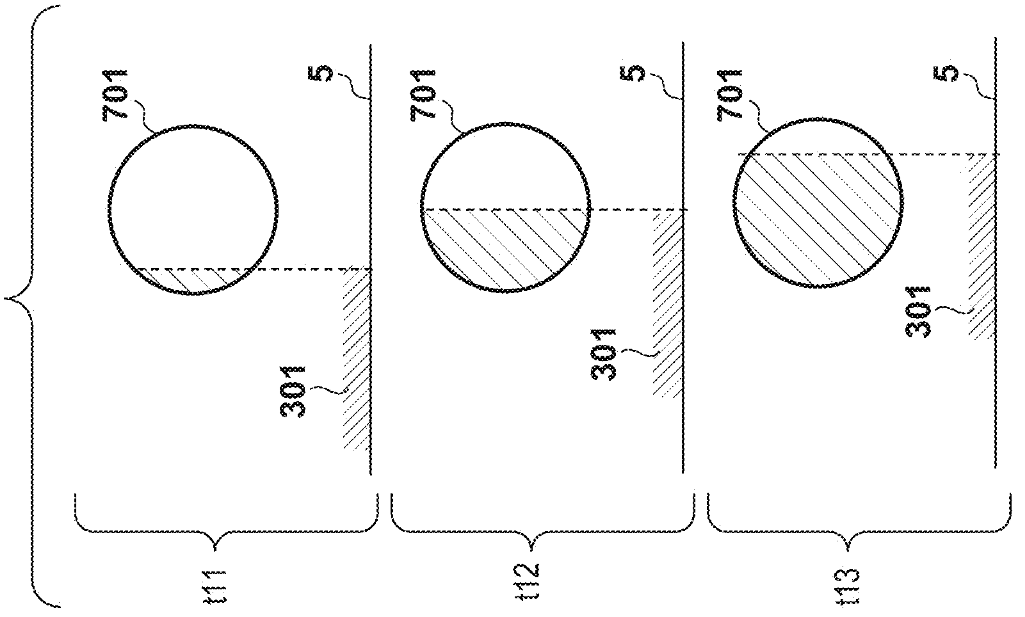

FIGS. 7A and 7B are timing charts for explaining the starting of the reading of the profile data. In FIG. 7A, the horizontal axis represents the sub-scanning direction. A detection spot 701 indicates a detection range (detection spot) of the density sensor 9. In FIG. 7B, the horizontal axis represents the time. The vertical axis represents the voltage level of the analog signal V1.

The hatched line given to the detection spot 701 shows, in a trial manner, how far the test image 301 has entered the detection spot 701. Time has elapsed in the order of time t11, time t12, and time t13.

In the time t11, the test image 301 enters a portion of the detection spot 701.

Therefore, the analog signal V1 is starting to be increased. In the time t12, the test image 301 covers half of the detection spot 701. Therefore, the analog signal V1 is further increased. In the time t13, the test image 301 covers substantially the entirety of the detection spot 701. Therefore, the analog signal V1 is further increased. When the test image 301 covers the entire detection spot 701, the analog signal V1 is stabilized. That is, the test image 301 reaches the sub-scanning position where the density sensor 9 can stably read the test image 301 without being affected by a shape of the detection spot 701. A typical density sensor 9 has a spot diameter of about 0.5 mm to 2 mm. Therefore, the CPU 201 acquires the profile data by considering the shapes of the detection spot 701, thereby acquiring the profile data with higher accuracy.

For example, assume that the threshold voltage Vth is set to the analog signal V1 at the moment the test image 301 covers the entire detection spot 701. In this case, there is a phase difference between the phase corresponding to the time t2' and the phase corresponding to the exposure starting timing by the conveyance time obtained by dividing the diameter of the detection spot 701 by the process speed. Therefore, the density unevenness acquired at the time t2' may be associated with the rotational phase advanced by the phase difference from the rotational phase corresponding to the exposure starting timing.

Alternatively, the threshold voltage Vth may be set to an analog signal V1 corresponding to the time t12. The time t12 is a timing at which the test image 301 covers half of the detection spot 701. In this case, the above-described phase difference becomes small, and it is possible to ignore the phase difference.

Figure 8:
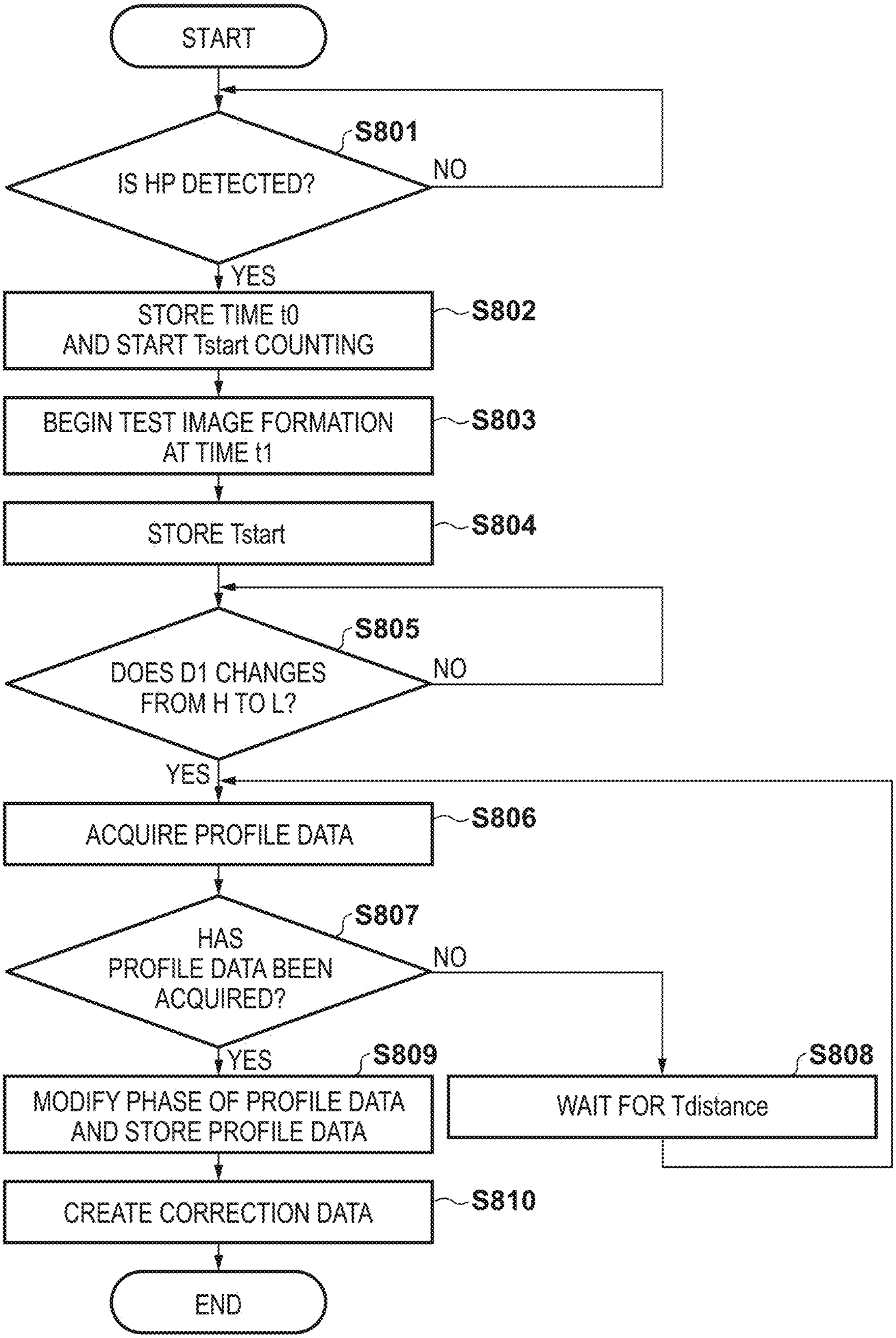
FIG. 8 is a flow chart showing a control method of a first embodiment.

FIG. 8 is a flow chart illustrating a control method executed by the CPU 201 according to a control program. The control program is stored in the ROM 210.

In S801, the CPU 201 determines whether the HP (reference phase) is detected based on the output signal of the HP sensor 7. For example, when the output signal of the HP sensor 7 changes from the high level (High) to the low level (Low), the CPU 201 advances the process from S801 to S802. Note that the relationship between the High level and the Low level may be reversed.

In S802, the CPU 201 (measuring unit 601) acquires the time to from the timer 401, stores it in the RAM 211, and starts counting Tstart. The counting of Tstart may be performed based on a counter circuit or the like.

In S803, the CPU 201 begins forming the test image 301. That is, the CPU 201 converts the image data of the test image 301 into the image signal and outputs the image signal to the exposure control unit 212. Thus, exposure to the photosensitive drum 1 is started.

In S804, the CPU 201 (measuring unit 601) acquires the time t1 at which the test image 301 is started to be formed from the timer 401, and stores the time difference between the time t1 and the time to as Tstart in the RAM 211.

In S805, the CPU 201 waits until the level of the digital signal D1 changes from High to Low. When the level of the digital signal D1 changes from High to Low, the CPU 201 advances the process from S805 to S806.

In S806, the CPU 201 acquires the profile data by starting sampling of the analog signal V1 outputted from the density sensor 9. The CPU 201 stores the digital signal D1, which is the density detection result, in the RAM 211 as the profile data in association with the time (rotational phase of the photosensitive drum 1) acquired from the timer 401. In the profile data, the rotational phase θ and the density data I form a pair. Thus, the CPU 201 may convert the time to the rotational phase θ.

In S807, the CPU 201 determines whether the profile data has been acquired. For example, when a predetermined time Trot has elapsed from the timing (time t2') at which the level of the digital signal D1 changes from High to Low, the CPU 201 may determine that the profile data has been acquired. Alternatively, when a predetermined number of density values (digital signal D1) are acquired, the CPU 201 may determine that the acquisition of the profile data is completed. If the profile data has not been acquired, the CPU 201 advances the process from S807 to S808.

In S808, the CPU 201 waits for a Tdistance and then advances the process from S808 to S806. On the other hand, if the profile data has been acquired, the CPU 201 advances the process from S807 to S809.

In S809, the CPU 201 (modifying unit 602) modifies the phase of the profile data stored in the RAM 211 and stores it in the RAM 211. For example, the phase of the profile data is shifted by a phase difference corresponding to Tstart. Thus, the profile data is profile data in which the reference phase is an initial phase (start point).

In S810, the CPU 201 (creating unit 603) creates the correction data of the control parameter (e.g., exposure amount) based on the profile data. As a result, the correction data starting from the HP (reference phase) as a starting point is generated and stored in the RAM 211.

(5) Second Embodiment

As described with reference to FIGS. 7A and 7B, when a size of the detection spot 701 of the density sensor 9 are larger, the accuracy of determining a reading start timing of the test image 301 may decrease. Therefore, in the second embodiment, the determination accuracy of the reading start timing of the test image 301 is improved by considering the size of the detection spot 701.

Figure 9A:
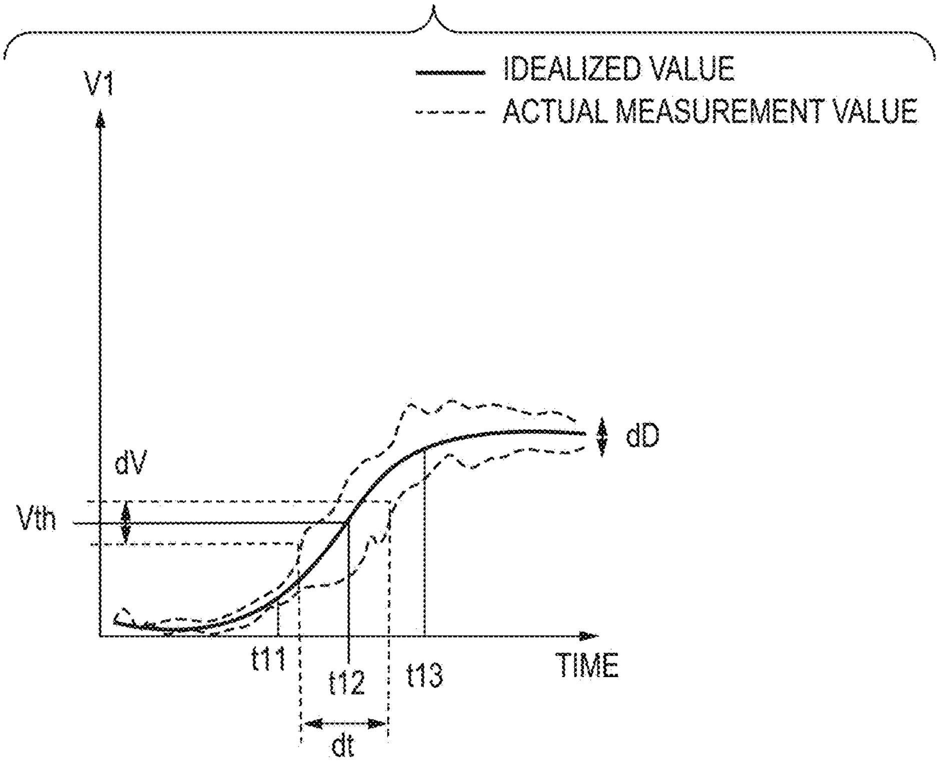
FIGS. 9A and 9B are diagrams for explaining effects of variations in a threshold voltage.

FIG. 9A is a diagram for explaining a relationship between an ideal value and an actual measurement value of the analog signal V1. The vertical axis represents the analog signal V1 (voltage value). The horizontal axis indicates time. The times t11 to t13 correspond to the times t11 to t13 shown in FIG. 7A. As shown in FIG. 9A, the threshold voltage Vth is the analog signal V1 at a timing (time t12) at which half of the detection spot 701 of the density sensor 9 is covered with the test image 301. However, in practice, the threshold voltage Vth also varies by a dV due to manufacturing variations in the voltage dividing resistors R1, R2.

In addition, a rising shape of the analog signal V1 corresponding to the leading edge of the test image 301 does not become a rising shape such as a rectangular wave. Therefore, the rising timing of the analog signal V1 may be delayed or accelerated with respect to the ideal timing.

Further, even at a timing when the entire detection spot 701 is covered with the test image 301, the detection density of the test image 301 may be higher or lower than the ideal density. The timing at which the level of the digital signal D1 changes is a timing at which the threshold voltage Vth and the analog signal V1 intersect each other. Therefore, the timing at which the level of the digital signal D1 changes also has a variation dt corresponding to the variation dV of the threshold voltage Vth. That is, dt is a variation at the reading start timing of the test image 301.

Figure 9B:
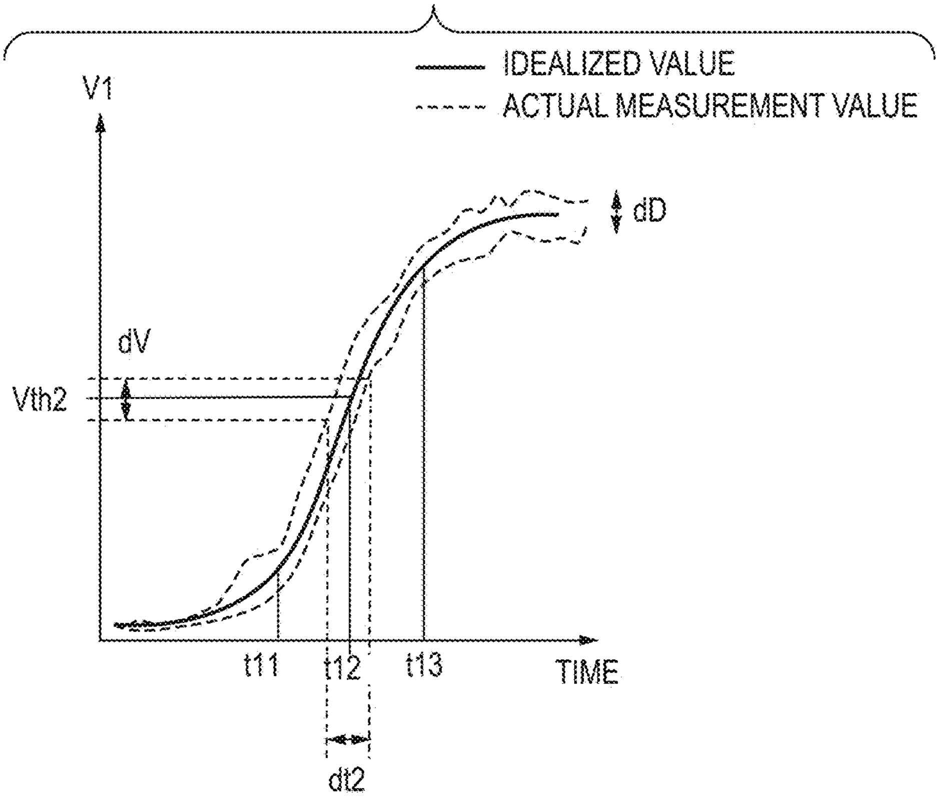

FIG. 9B is a diagram for explaining a method of reducing the effect of the variation dt of the reading start timing. The vertical axis represents the analog signal V1 (voltage value). The horizontal axis indicates time. The times t11 to t13 correspond to the times t11 to t13 shown in FIG. 7A.

The density of the test image 301 used in FIG. 9B is higher than the density of the test image 301 used in FIG. 9A. The new threshold voltage Vth2 is also higher than the threshold voltage Vth of the first embodiment.

The threshold voltage Vth2 is also affected by variations in the resistance of the voltage dividing resistors R1, R2. However, the variation dV for the threshold voltage Vth2 is equal to the variation dV for the threshold voltage Vth. In addition, the rise of the analog signal V1 becomes steep as the density of the test image 301 is increased. In a state where the density of the test image 301 can be stably read, the variation dD of the detection density of the test image 301 whose density has been increased is equal to the variation dD of the detection density of the test image 301 of the first embodiment. As a consequence, dt2 of variations in the reading start timing of the test image 301 is relatively reduced.

Figure 10A:
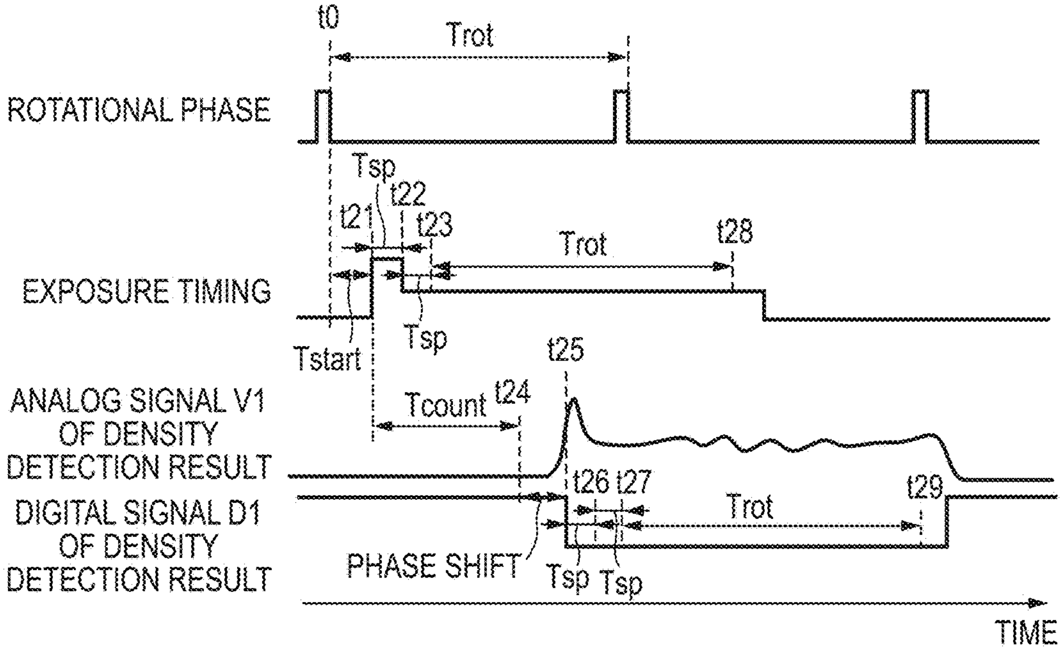
FIG. 10A is a timing chart showing how to obtain profile data.
Figure 10B:
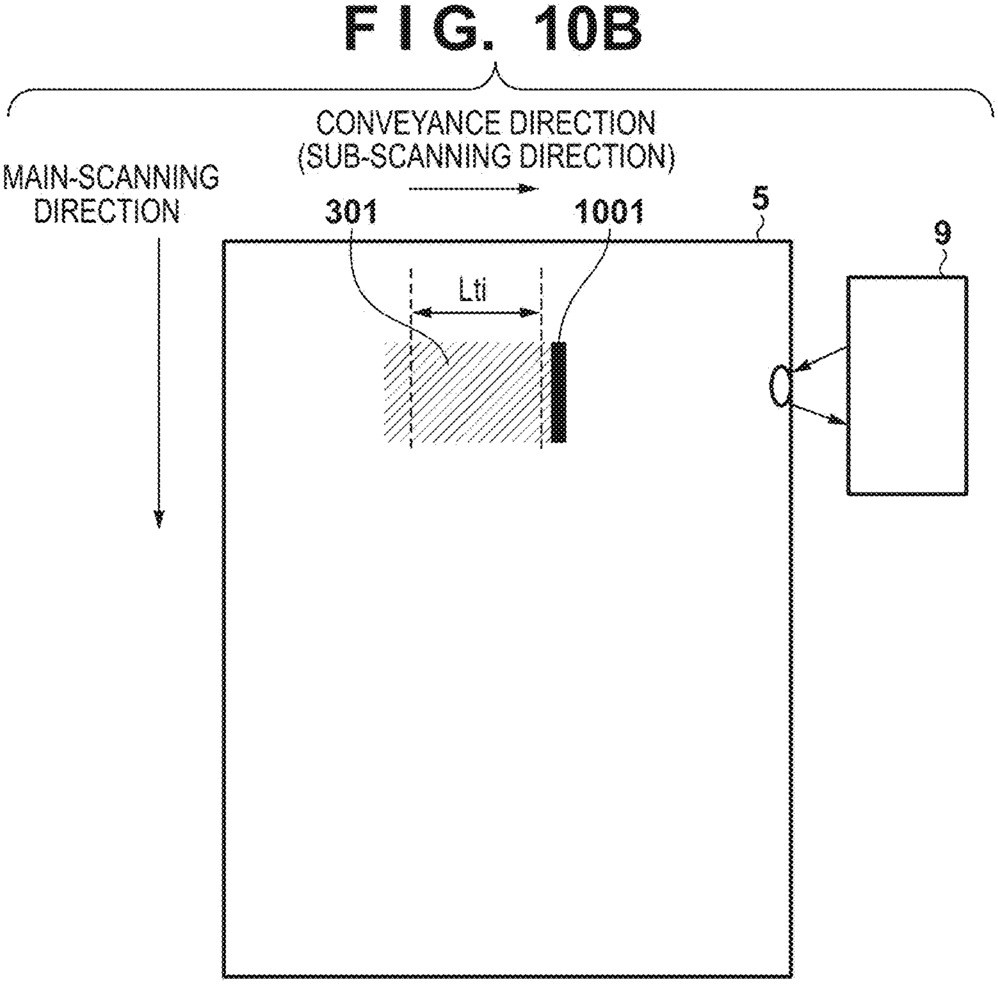
FIG. 10B is a view for explaining a start image.

FIG. 10A is a timing chart illustrating the beginning of acquiring the profile data according to the second embodiment. FIG. 10B shows a start image (preceding image) 1001 that is formed at the leading edge of the test image 301 and indicates the beginning of acquiring the profile data. The density of the start image 1001 is darker (higher) than the density of the test image 301.

In the time to, the signal outputted from the HP sensor 7 falls. At a timing (time t21) at which the predetermined time Tstart has elapsed from the time t0, the exposure device 2 starts outputting the laser beam so as to have a constant exposure amount. Here, the exposure amount of the laser beam is set to an exposure amount E1 corresponding to the density of the start image 1001.

At the time t22, the CPU 201 switches the exposure amount of the laser beam from E1 to E2. Here, the time interval from the time t21 to the time t22 is Tsp. Tsp is obtained by dividing the diameter of the detection spot 701 by the process speed (the peripheral speed of the intermediate transfer belt 5). That is, the diameter of the detection spot 701 is equal to the length of the start image 1001 in the sub-scanning direction. Therefore, the length of the start image 1001 in the sub-scanning direction is shorter than the length of the test image 301 in the sub-scanning direction. The exposure amount E2 is an exposure amount corresponding to the density of the test image 301.

The time t23 is a time at which the time Tsp has elapsed from the time t22. The time t28 is a time at which only a Trot has elapsed from the time t23. In other words, the length of the test image 301 in the sub-scanning direction is the sum of the circumference of the photosensitive drum 1 and the diameter of the detection spot 701. Thereafter, the test image 301 is conveyed to the detection position of the density sensor 9, and is detected by the density sensor 9.

The time t24 is a time at which a predetermined time Tcount has elapsed from the exposure starting timing (time t21). In this example, a phase shift occurs.

At the time t25, the analog signal V1 exceeds the threshold voltage Vth2 and the level of the digital signal D1 changes from High to Low. Here, the time Tsp from the time t25 to the time t26 is a time during which the start image 1001 is detected by the density sensor 9. The start image 1001 reaches the detection position of the density sensor 9 prior to the test image 301. A Tsp is adopted as a waiting time (margin) until the detection result is switched from the detection result of the start image 1001 to the detection result of the test image 301. This margin is a waiting time required for the detection result of the density sensor 9 to stabilize as the detection result of the test image 301. That is, the CPU 201 waits until a timing (time t27) at which the time Tsp elapses from the time t26.

At the time t27, the CPU 201 starts reading the test image 301 (obtain profile data). The CPU 201 obtains the profile data over the time Trot. At the time t29, the CPU 201 ends acquiring the profile data.

Note that the CPU 201 may begin acquiring the profile data from the time t25, and exclude the density data acquired from the time t25 to the time t27 as invalid data. Note that the phase of the density data acquired at the time t27 is a phase that is advanced by a phase difference corresponding to Tstart+2×Tsp from the reference phase.

Figure 11:
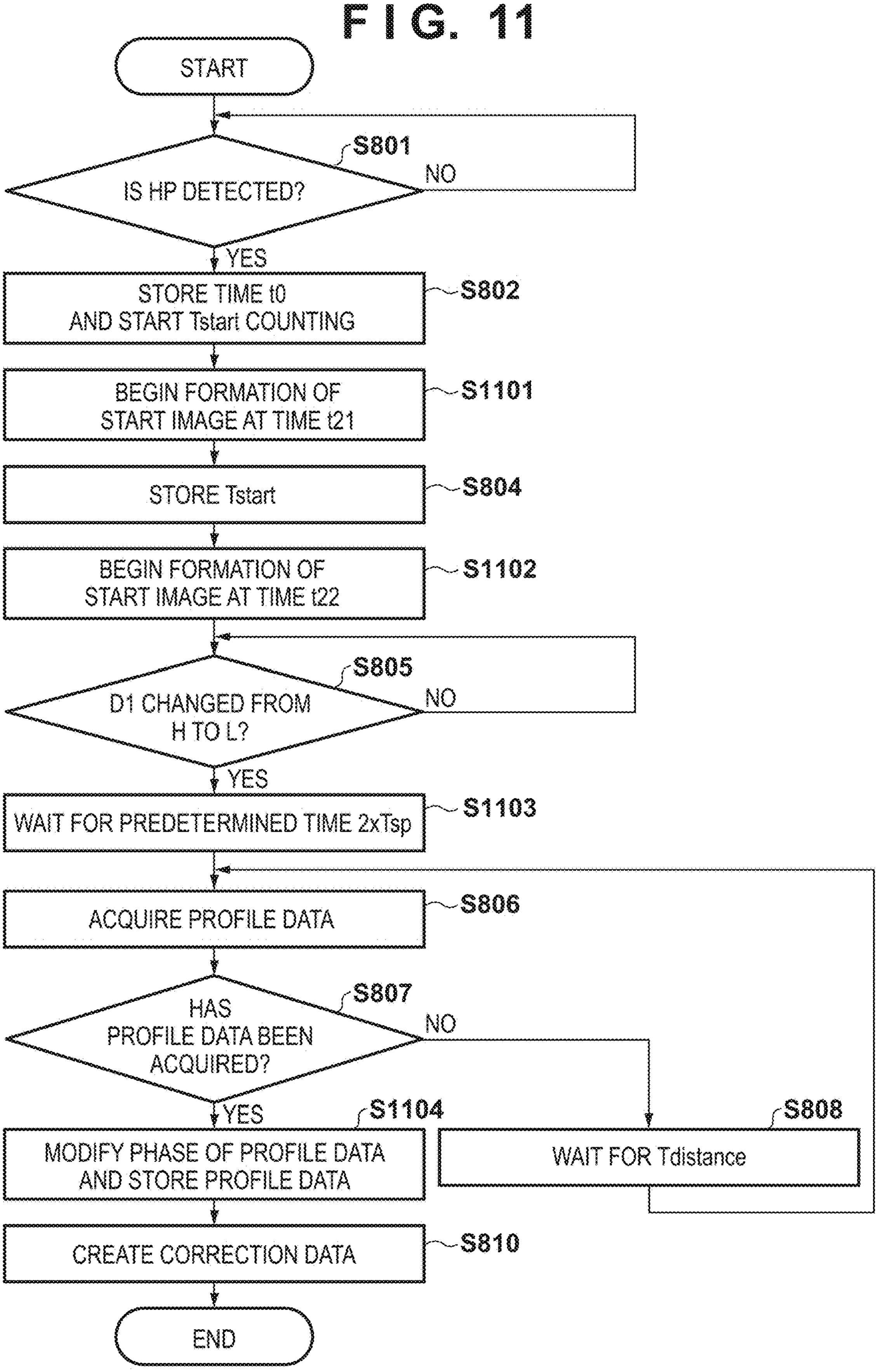
FIG. 11 is a flow chart showing a control method of a second embodiment.
Figure 12:
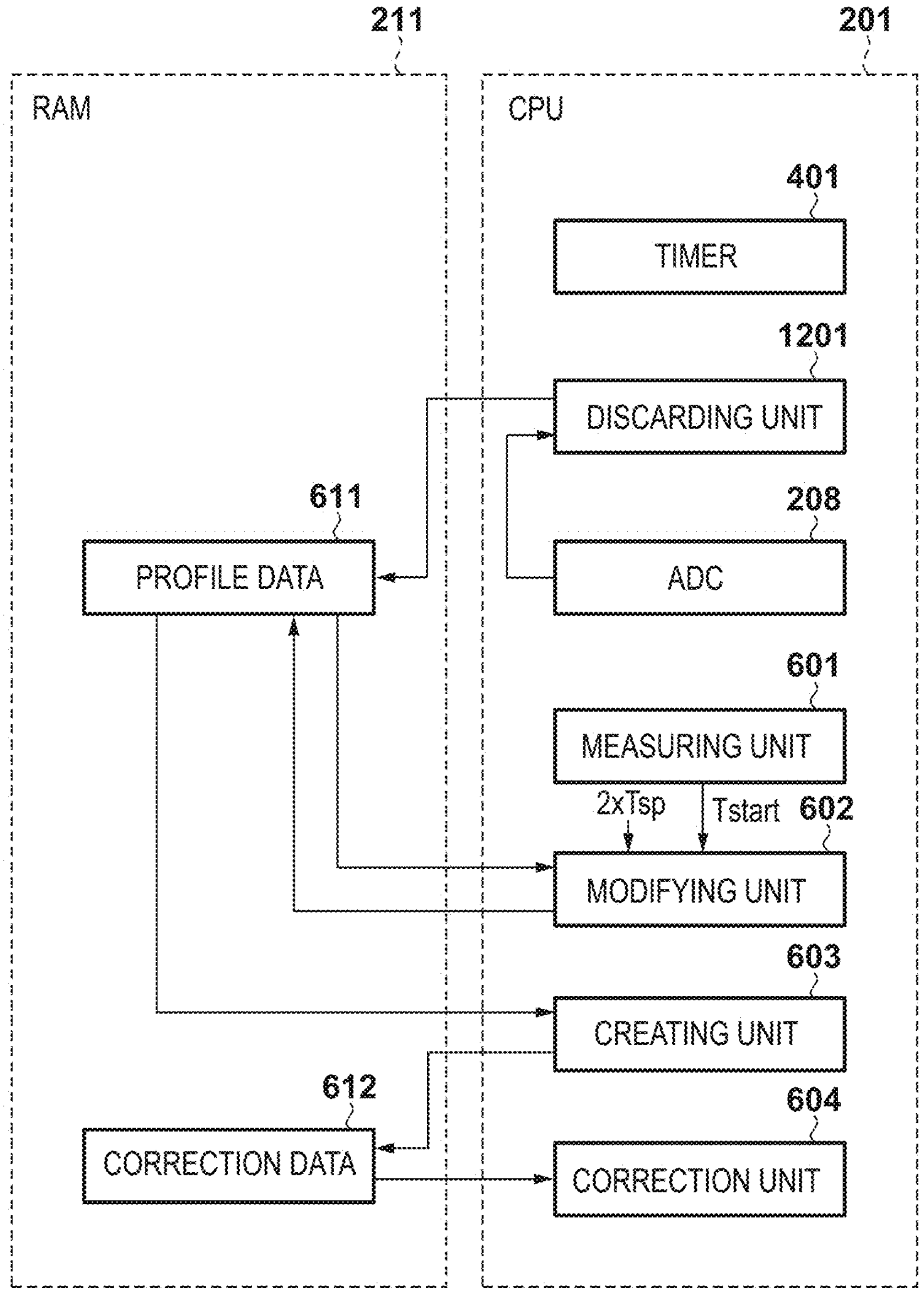
FIG. 12 is a diagram showing functions realized by the CPU.

FIG. 11 is a flow chart illustrating a control method executed by the CPU 201 according to a control program. Among the steps shown in FIG. 11, the same reference numerals are given to the steps common to the steps shown in FIG. 8, and the description thereof is omitted. FIG. 12 illustrates functions implemented by the CPU 201. The discarding unit 1201 discards (invalidates) invalid data derived from the start image 1001 in the profile data 611.

The CPU 201 advances the process from S802 to S1101. In S1101, the CPU 201 sets the exposure amount to E1 and starts forming the start image 1001. The CPU 201 then proceeds the process from S1101 to S804. Further, when the time Tsp elapses from the time t21, the CPU 201 advances the process from S804 to S1102.

At S1102, the CPU 201 sets the exposure amount to E2 and begins forming the test image 301. Here, the exposure amount E2 is smaller than the exposure amount E1. Forming of the test image 301 is performed for at least a predetermined period of time (Tsp+Trot). The CPU 201 executes S805 after S1102. In S805, the CPU 201 generates the digital signal D1 using the threshold voltage Vth2. The CPU 201 then proceeds the process from S805 to S1103.

In S1103, the CPU 201 (discarding unit 1201) waits for a predetermined period (2×Tsp). This is to discard the density data acquired from the start image 1001. Note that the discarding unit 1201 may discard the density data acquired from the start image 1001 by deleting data for a predetermined period of time (2×Tsp) included in the profile data 611.

The CPU 201 then repeats S806, S807 and S808. When acquiring the profile data is completed in S807, the CPU 201 advances the process from S807 to S1104. Thus, N pieces of density data Ii are acquired. The index i of li is an integer from 0 to N−1. Nis obtained by dividing Trot by Tdistance.

In S1104, the CPU 201 (modifying unit 602) modifies the phase of the profile data 611 and stores it in the RAM 211. As shown in FIG. 10A, the density data I (the density data acquired at the time t27) located at the head of the profile data 611 is data acquired from the test image 301 formed by the laser beams irradiated to the photosensitive drum 1 at the time t23. That is, the rotational phase corresponding to the time t23 is a rotational phase advanced by a predetermined phase difference from the reference phase. Here, the predetermined phase difference is obtained by converting Tstart+2×Tsp into a phase difference. Therefore, the modifying unit 602 modifies the profile data 611 by shifting the phase of the acquired profile data 611 by a predetermined phase difference (Tstart+2×Tsp).

As a result, the profile data 611 having the density data of the reference phase as the head is completed. Then, in S810, the CPU 201 (creating unit 603) creates the correction data 612 starting from the reference phase (time to) based on the profile data 611.

(6) Technical Ideas Derived from the Embodiments

A part of the CPU 201 and the density sensor 9 (e.g., the comparator 400) is an example of a controller. Another part of the ADC 208 and the density sensor 9 (e.g., the light receiving element 92) is an example of output circuitry. The CPU 201 acquires, as profile data relating to a density of a test image, an output value after the output value output from the output circuit exceeds a threshold value. The CPU 201 obtains a time difference from a timing at which a reference phase is detected by a phase sensor to a timing at which an exposure light source starts exposure to form a test image. Further, the CPU 201 determines a phase of the profile data based on a time difference. The CPU 201 controls density unevenness in a rotation direction of a photosensitive member of the toner image formed by an image forming unit based on the profile data and a phase of the profile data. The density sensor 9 is an example of a sensor that receives the reflected light from the test image on an intermediate transfer member that passes through a detection position, and outputs an output signal based on a reception result of the reflected light. The CPU 201 is configured to reduce density unevenness in the rotation direction of the photosensitive member of images to be formed based on the correction data. The CPU 201 determines a reference output signal to be used for generating the correction data among output signals output from the sensor in time series based on a timing at which the test image has reached the detection position. As a result, the profile data is acquired with higher accuracy than in the related art.

The comparator 400 is an example of a detection unit that detects timing. The CPU 201 may be configured to determine, based on the timing detected by the detection unit, the reference output signal used to generate the correction data. The comparator 400 may include a comparator that compares the output signals output from the sensors in time series with a threshold value. The detection unit may detect the timing based on a comparison result of the output signal by the comparator. Based on the correction data, the amount of light with which the light source exposes the photosensitive member is controlled. The developing voltage or the charging voltage may be controlled based on the correction data.

By adopting a halftone image as the test image 301, the density unevenness can be detected with higher accuracy as compared with a solid image.

The comparator 400 is an example of a comparison circuit. High level and Low level, or Low level and High level are exemplary first values and second values.

The charging voltage applied to the charging roller 4, the developing voltage applied to the developing roller of the developing device 3, and the exposure amount of the light source (semiconductor laser or the like) of the exposure device 2 are examples of control parameters.

The CPU 201 may control the density unevenness by controlling the charging member based on the profile data and the phase of the profile data.

The CPU 201 may control the density unevenness by controlling the exposure light source based on the profile data and the phase of the profile data.

The CPU 201 may control the density unevenness by controlling the developing member based on the profile data and the phase of the profile data.

As illustrated in FIG. 10B, the start image 1001 as a preceding image may be formed in front of the halftone test image 301. In this way, the preceding image may arrive at the detection position prior to the test image.

The optical density of the start image (preceding image) is darker than the optical density of the halftone image (test image). As a result, it is possible to start acquiring the profile data with high accuracy. In particular, the effects of manufacturing variations of the voltage dividing resistors R1, R2 are reduced.

The length of the halftone image formed on the intermediate transfer member is longer than the circumferential length of the photosensitive member. By making the length of the test image 301 longer than the circumference of the photosensitive drum 1, the profile data can be acquired with a margin. For example, the instability of the density detection result caused by the detection spot 701 having a non-negligible area is reduced.

Note that the length of the preceding image in the rotation direction in which intermediate transfer member rotates may be shorter than the length of the test image in the rotation direction.

Extract (obtain) of the optical density of the test image 301 may be started at a timing when the start image 1001 passes through the detection spot 701 and the test image 301 occupies the entire detection spot 701. As a result, the profile data can be acquired with high accuracy.

The predetermined waiting time is longer than the forming time of the start image. For example, the predetermined waiting time is longer than the passing time when the start image passes through the detection position of the density sensor 9.

As described above, the predetermined waiting time may be longer than the forming time corresponding to the length of the start image 1001 in the sub-scanning direction. Thereby, the influence of the start image 1001 is reduced with high accuracy.

The start image 1001 is longer than the detection spot 701. Thereby, the start timing will be specified with high accuracy.

The detector detects the rotational phase of the photosensitive member. The CPU 201 may be configured to reduce the density unevenness in the rotation direction of the image to be formed on the basis of the correction data and the detection result of the detector. The CPU 201 may generate the correction data based on the output signal and the detection result of the detector. The timing at which the light source exposes the photosensitive member to form an electrostatic latent image of the test image may be controlled based on the detection result of the detector.

The CPU 201 may determine the head of the reference output signal used to generate the correction data among the output signals output from the sensor in time series based on the timing at which the test image has reached the detection position. The CPU 201 may determine the end of the reference output signal to be used to generate the correction data, among the output signals output from the sensor in time series, based on the timing at which the test image has reached the detection position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-173859, filed Oct. 5, 2023 which is hereby incorporated by reference herein in its entirety.

What is claimed is:

1. An image forming apparatus that forms an image on a sheet, the apparatus comprising:
- an image forming unit configured to form an image on a photosensitive member that rotates;
- an intermediate transfer member to which the image is transferred from the photosensitive member;
- a sensor configured to receive reflected light from a test image on the intermediate transfer member passing through a detection position and output an output signal based on a reception result of the reflected light, the test image being formed by the image forming unit; and
- a controller configured to:
  - reduce density unevenness of the image to be formed in a rotation direction of the photosensitive member based on correction data; and
  - determine a reference output signal used to generate the correction data among output signals output from the sensor in time series based on a timing at which the test image reaches the detection position by performing the steps of:
    - detecting, based on a comparison of the output signals with a threshold value, a timing at which a level of a signal binarized by the comparison changes; and
    - determining the reference output signal based on the detected timing.

2. The image forming apparatus according to claim 1, further comprising a detection unit configured to detect the timing,
- wherein the controller is further configured to determine the reference output signal used to generate the correction data based on the timing detected by the detection unit.

3. The image forming apparatus according to claim 2, wherein
- the detection unit further comprises a comparator configured to compare the output signals output from the sensor in time series with the threshold value, and
- the detection unit is further configured to detect the timing based on the comparison of the output signals with the threshold value by the comparator.

4. The image forming apparatus according to claim 3, wherein
- the image forming unit is further configured to form a preceding image, and
- the preceding image arrives at the detection position prior to the test image.

5. The image forming apparatus according to claim 4, wherein a density of the preceding image is higher than a density of the test image.

6. The image forming apparatus according to claim 4, wherein a length of the preceding image in a rotation direction in which the intermediate transfer member rotates is shorter than a length of the test image in the rotation direction.

7. The image forming apparatus according to claim 1, wherein the image forming unit includes a charging member configured to charge the photosensitive member, a light source configured to expose the photosensitive member charged by the charging member to form an electrostatic latent image on the photosensitive member, and a developing sleeve configured to develop the electrostatic latent image on the photosensitive member, and the controller is further configured to control an amount of light with which the light source exposes the photosensitive member based on the correction data.

8. The image forming apparatus according to claim 1, wherein the image forming unit includes a charging member configured to charge the photosensitive member, a light source configured to expose the photosensitive member charged by the charging member to form an electrostatic latent image on the photosensitive member, and a developing sleeve configured to develop the electrostatic latent image on the photosensitive member based on a developing voltage, and the controller is further configured to control the developing voltage based on the correction data.

9. The image forming apparatus according to claim 1, wherein the image forming unit includes a charging member configured to charge the photosensitive member based on a charging voltage, a light source configured to expose the photosensitive member charged by the charging member to form an electrostatic latent image on the photosensitive member, and a developing sleeve configured to develop the electrostatic latent image on the photosensitive member, and the controller is further configured to control the charging voltage based on the correction data.

10. The image forming apparatus according to claim 1, further comprising a detector used to detect a rotational phase of the photosensitive member, wherein the controller is further configured to reduce the density unevenness of the images in the rotation direction to be formed based on the correction data and a detection result of the detector.

11. The image forming apparatus according to claim 1, further comprising a detector used to detect a rotational phase of the photosensitive member, wherein the controller is further configured to generate the correction data based on the reference output signal used to generate the correction data and a detection result of the detector.

12. The image forming apparatus according to claim 1, further comprising a detector used to detect a rotational phase of the photosensitive member, wherein the image forming unit includes a charging member configured to charge the photosensitive member, a light source configured to expose the photosensitive member charged by the charging member to form an electrostatic latent image on the photosensitive member, and a developing sleeve configured to develop the electrostatic latent image on the photosensitive member, and a timing at which the light source exposes the photosensitive member to form an electrostatic latent image of the test image is controlled based on a detection result by the detector.

13. The image forming apparatus according to claim 1, wherein a length of the test image in a rotation direction in which the intermediate transfer member rotates is longer than a circumferential length of the photosensitive member.

14. The image forming apparatus according to claim 1, wherein the controller is further configured to determine, based on a timing at which the test image reaches the detection position, a head of the reference output signal used to generate the correction data among the output signals output from the sensor in time series.

15. The image forming apparatus according to claim 1, wherein the controller determines, based on a timing at which the test image reaches the detection position, an end of the reference output signal used to generate the correction data among the output signals output from the sensor in time series.

* * * * *